Feb. 14, 1956  F. C. GEBHART  2,734,726
TRAILER JACK
Filed June 22, 1953
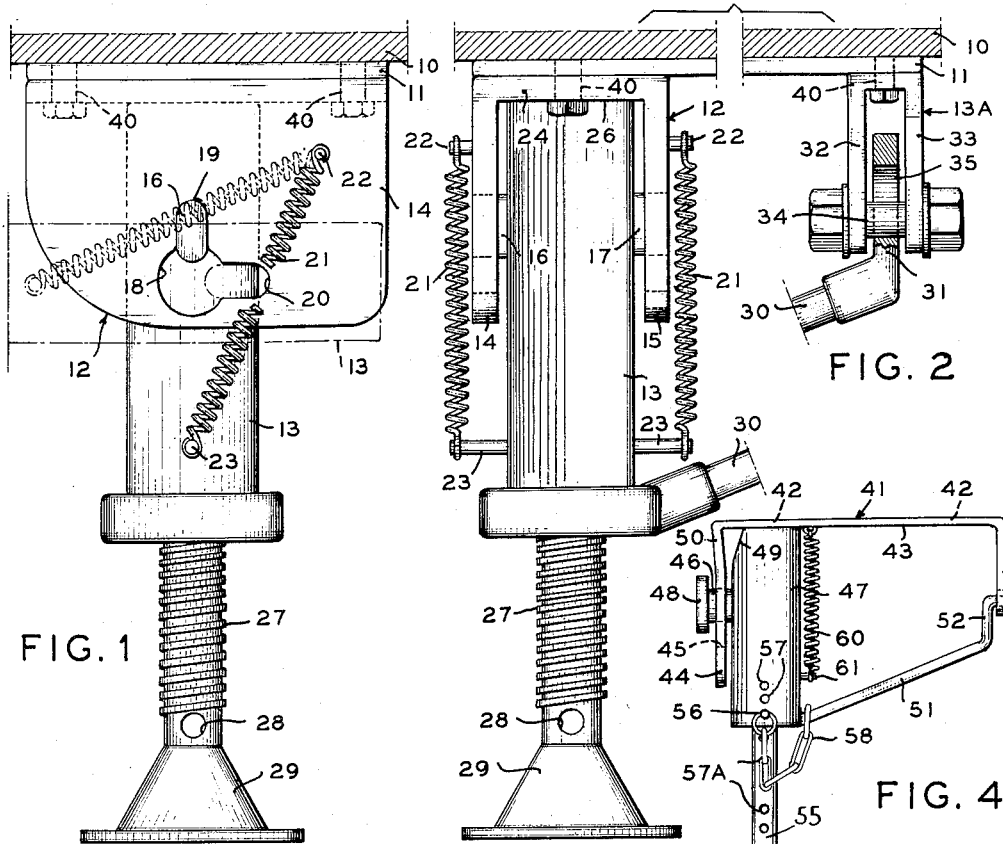
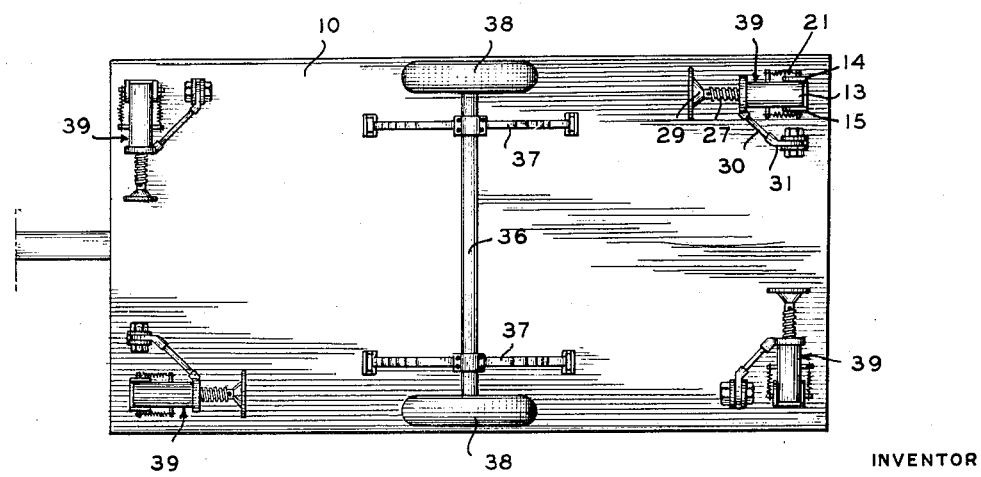
INVENTOR
FLOYD C. GEBHART
BY A. Yates Dowell
ATTORNEY though the sleeve 13 or may be separate lugs cast upon

United States Patent Office 2,734,726
Patented Feb. 14, 1956

2,734,726

TRAILER JACK

Floyd C. Gebhart, Springport, Ind.

Application June 22, 1953, Serial No. 363,012

6 Claims. (Cl. 254—86)

The present invention relates to a jack of general utility which is particularly useful for permanent attachment to a vehicle.

Various types of lifting jacks have been secured to vehicles and some have been pivotally mounted so that they may be vertical for lifting the vehicle or horizontal for storing. There have been problems which have not been satisfactorily solved for maintaining the jacks in the stored position and it has been the practice to use chains, hooks or the like for maintaining such jacks in their inoperative position.

An object of the present invention is to overcome the inconveniences and unsatisfactory operation of the lifting jacks of the prior art.

Another object of the present invention is to provide a lifting jack for permanent attachment to a vehicle in which the jack may be moved from its operative to inoperative position and be maintained in either position without danger of the jack becoming displaced.

Another object of the invention is to provide a lifting jack at each corner of a vehicle with means to prevent rocking of the vehicle on the jacks.

A further object of the invention is to provide unitary attaching means for each jack whereby each jack may be secured with a minimum of fastening elements and in a minimum of time.

A further object is to provide a unitary article for sale to owners of trailers or the like in which such owners may apply the present invention to existing trailer structures.

The lifting or holding jack of the present invention comprises a structure for attachment to a vehicle from which the jack is pivotally mounted. Suitable cam means provide interengagement for securing the jack in its upright operative position and also for securing the jack in its pivoted horizontal position without requiring any loose parts.

Further objects and advantages of the present invention will be apparent from the following description taken in conjunction with the drawings, wherein:

Figure 1 is an end elevation of the jack in its operative position with a dotted line representation of the jack in stored position;

Fig. 2, a front elevation of the jack in its operative position;

Fig. 3, a diagrammatic showing of a bottom plan view of the jacks mounted on the corners of a vehicle; and Fig. 4, a modified form of the invention on a reduced scale.

Referring to Figs. 1 and 2, a portion of a supported body 10, such as a trailer or the like is engaged by a base plate 11 from which a U-shaped bracket 12 and a U-shaped member 13A project downwardly in the same direction. An internally threaded jack sleeve 13 is positioned between legs 14 and 15 of the U-shaped bracket 12 and is provided with outwardly extending lugs 16 and 17 which may be portions of a solid pin extending through the sleeve 13 or may be separate lugs cast upon or otherwise fixed to the sleeve by welding or the like. Each leg 14 and 15 is provided with a generally L-shaped lug receiving opening 18 including an upwardly extending recess 19 and a generally horizontally extending recess 20 which recesses snugly receive the flattened lug 16 for maintaining the sleeve in its upright full-line position or its stored horizontal position shown in dotted lines in Fig. 1. It is contemplated that the recess 20 may be arranged so that the closed end thereof is slightly below the end in communication with the circular portion of the lug receiving opening 18 so that the force of gravity will additionally maintain the jack in its stored, generally horizontal, position.

Coiled springs 21, spaced adjacent to and outwardly of legs 14 and 15 of the U-shaped bracket are secured to projecting pins 22 fixed to the legs of the bracket and extend to and are secured to the outer ends of projecting pins 23, fixed on the threaded jack sleeve 13. The pins 22 and 23 may be provided with suitable recesses or grooves for engagement with the eyes at the ends of the spring for maintaining the springs in assembled relation in a known manner. It will be obvious that the pins 22 and 23 are located substantially as shown in Fig. 1 so that the tension of the springs will urge the lugs 16 into positive engagement with the recess 19 or 20 and maintain the jack in its upright or stored position. It will be observed that the upper end 26 of the sleeve 13 may engage the bight portion 24 of the U-shaped bracket to take part of the reaction of the jack or the upper end of the sleeve 13 may terminate short of bight portion 24 so that the lugs 16 and 17 take the entire reaction.

An externally threaded screw 27 is threaded into the internally threaded sleeve 13 and may be adjusted by means of a conventional bar or rod inserted into the opening 28 in a known manner. Any suitable ground engaging means such as the flanged hollow pyramid 29 may be fixedly secured or rotatably mounted on the end of the threaded screw 27 in any convenient manner.

Although the structure described above is satisfactory for use as a jack, in some circumstances it is desirable to provide lateral bracing, and this may be accomplished by means of a strut 30 fixed at one end to the lower portion of the internally threaded sleeve 13 and provided with an offset portion 31 at its other end. The offset portion 31 extends between the arms 32 and 33 of the U-shaped member and a bolt, rivet, or the like 34 passes through openings in the arms 32 and 33 and through an enlarged opening 35 in the offset portion 31.

It will be noted that the extensible supporting means, including the sleeve 13 and the screw 27, may be fixed in the upright position shown in full lines or moved to the horizontal stored position (shown in doted lines in Fig. 1) as well. The space between the sleeve 13 and the legs 14 and 15 is sufficient to permit this movement of the extensible supporting means.

The conventional trailer 10 provided with the usual axle 36, supported on springs 37 is movable on wheels 38 rotatably mounted on the axle. At each corner of the trailer a jack assembly 39, similar to that described above is pivotally mounted but the base plate 11 is omitted since the U-shaped bracket 12 and the U-shaped member 13A may be directly secured to the trailer by means of fastenings such as bolts, screws, or the like which may pass through the openings 40. It will be observed that each of the jack assemblies 39 are pivotally mounted on an axis which is transverse to the axis of the jack assembly at the next adjacent corner. This structure increases the stability of the trailer when the jacks support the same since the struts 30 each extend in a different direction.

Referring to Fig. 4, a modification of the invention includes a bracket 41 provided with fastener receiving openings 42 in the bight portion 43 thereof. A downwardly extending leg 44 is provided with an L-shaped opening 45 similar to opening 18 and recesses 19 and 20 of Fig. 1 for receiving a lug 46 which is fixed to the sleeve 47. The L-shaped opening 45 provides a lost motion connecting means between the lug 46 and the leg 44. The lug 46 is of appreciable length and is provided with a flange 48 at its outer extremity, which flange may be welded or otherwise suitably secured to the lug 46 to prevent accidental separation of said lug from said leg. The upper left portion of the sleeve 47 may be slightly cut away at 49 and/or the leg 44 may be provided with an acute angular portion 50 for permitting angular displacement of the sleeve 47 to allow clearance for moving the jack assembly from operative to stored positions.

A strut 51 is secured at one end to the lower portion of the sleeve 47 and is provided with an offset 52 at its other end and a pivot portion 53 loosely passing through an opening in the leg 54 of the bracket 41. Said strut serves to laterally brace the jack in use.

An elongated member 55 is slidable into and out of sleeve 47 and is secured in an adjusted position by means of a pin 56 passing through one of the openings 57 in the sleeve 47 and into one of the openings 57A of the slidable member. If desired, a suitable chain 58 may be secured to the strut 51 and to the pin 56 to prevent loss of the pin. It will be observed that the bottom openings 57 in the sleeve 47 for receiving the pin 56 are spaced above the bottom of the sleeve 47 by an amount which is different from the spacing between openings 57A of the slidable member 55, and consequently, the pin 56 may be inserted into one of the openings 57A below the bottom of the sleeve 47 to produce intermediate adjustment. If desired, other openings 57 may be provided in sleeve 47 at varying spaced distances to permit more accurate adjustment when such is desirable. A hollow flanged pyramid or cone 59 may be secured to the lower end of the slidable member 55.

In the use of the modification shown in Fig. 4, a conventional lifting jack may be used to obtain the desired level for that portion of the trailer and the slidable member 55 is extended the desired amount and the pin 56 inserted to maintain the desired elevation. The operation is repeated for each of the extensible supporting means and the trailer may be leveled as accurately as necessary, partially taking the weight off the springs to prevent rocking of the trailer when the load is shifted from one position to another such as by a person walking across the same.

It will be evident that a spring 60 may be secured at one end to a pin 61 on the sleeve 47 and secured at its other end to the bight portion of the bracket 41 in any convenient manner so that the spring 60 may maintain the sleeve 47 in its upright or horizontal position similar to that of the first modification. In some circumstances, for example, when the recess 20 is arranged so the closed end extends downwardly as described above, spring 60 may be omitted.

It will be obvious to those skilled in the art that various changes may be made in the invention without departing from the spirit and scope thereof and therefore this invention is not limited to that shown in the drawings nor to that described in the specification but only as indicated in the appended claims.

What is claimed is:

1. A jack structure for atachment to a vehicle comprising a base plate, a U-shaped bracket fixed to one end of the base plate, a U-shaped member fixed to the other end of the base plate and projecting in the same direction as said bracket, a sleeve positioned in said bracket, a pivot pin projecting through said sleeve and through the legs of said bracket, said pin being fixed to the sleeve and having flattened projecting ends, the legs of said bracket being provided with aligned passages for receiving the flattened ends of said pin, each of said passages being in communication with a vertical recess formed in said legs and each of said passages also being in communication with a horizontal recess formed in said legs, said horizontal and vertical recesses having substantially parallel sides for receiving the flatened ends of said pin whereby the sleeve may be maintained in a position parallel with said legs or in a position substantially transverse thereto, a spring positioned outside of and adjacent to and spaced from each leg of the bracket and secured at one end to the adjacent leg and secured at its other end to a projection on the sleeve, the points of securement of said spring being such as to maintain the sleeve in vertical or horizontal position, means movable in said sleeve for engagement with the ground and adjustable to vary the distance from the end of said movable means with respect to the bracket, and a strut extending from said sleeve and pivoted in said U-shaped member for increasing the lateral stability of the jack.

2. A jack structure for attachment to a vehicle comprising a U-shaped bracket, means for securing the bight portion of the U-shaped bracket to the vehicle, the legs of said U-shaped bracket being provided with openings in register with one another, each opening having recesses at right angles to each other, the whole forming an L-shaped recess, a sleeve positioned in said bracket, lugs projecting from said sleeve and into said L-shaped recesses, said lugs being non-circular for reception in each arm of the L-shaped recesses whereby the sleeve is maintained rigidly in either of at least two different angular positions, movable means in said sleeve for projection and retraction therefrom and having a ground engaging end, and means for fixing the movable member in adjusted positions.

3. A support for attachment to a vehicle comprising a U-shaped member provided with pivotal openings in each leg in approximate alignment, a sleeve of relatively small breadth positioned in said U-shaped member adjacent one leg thereof, a flattened lug fixed on said sleeve and projecting through the opening in the adjacent leg, the opening of said adjacent leg having a vertically extending portion and a horizontally extending portion for engagement with said flattened lug for retaining said sleeve in projected position or in a position transverse thereto, a strut secured at one of its ends to said sleeve at a location spaced longitudinally from said lug and projecting to and loosely pivoted in the opening of the other leg of said U-shaped member, a boss on the outer end of said lug for preventing removal of said lug from said one leg, said sleeve being engageable with the bight portion of said U-shaped member, and extensible means projecting from the other end of said sleeve for engagement with the ground and means for fixing said extensible member in adjusted position.

4. A support for attachment to a vehicle comprising a U-shaped member provided with pivotal openings in each leg in approximate alignment, a sleeve of relatively small breadth positioned in said U-shaped member adjacent one leg thereof, a flattened lug fixed on said sleeve and projecting through the opening in the adjacent leg, the opening of said adjacent leg having a vertically extending portion and a horizontally extending portion for engagement with said flattened lug for retaining said sleeve in projected position or in a position transverse thereto, a second lug secured at one of its ends to said sleeve and projecting to and loosely pivoted in the opening of the other leg of said U-shaped member, said sleeve being engageable with the bight portion of said U-shaped member, and extensible means projecting from the other end of said sleeve for engagement with the ground and means for fixing said extensible member in adjusted position.

5. A support for attachment to a vehicle comprising a U-shaped member provided with pivotal openings in each leg in approximate alignment, a sleeve of relatively small breadth positioned in said U-shaped member adjacent one leg thereof, a flattened lug fixed on said sleeve and projecting through the opening in the adjacent leg, the opening of said adjacent leg having a vertically extending portion and a horizontally extending portion for engagement with said flattened lug for retaining said sleeve in projected position or in a position transverse thereto, a strut secured at one of its ends to said sleeve at a location spaced longitudinally from said lug and projecting to and loosely pivoted in the opening of the other leg of said U-shaped member, said sleeve being engageable with the bight portion of said U-shaped member, extensible means projecting from the other end of said sleeve for engagement with the ground, and means for fixing said extensible member in adjusted position.

6. A jack structure for attachment to a vehicle comprising means provided with a plurality of legs having pivotal openings therein, a sleeve positioned in said means adjacent one leg thereof, a flattened lug fixed on said sleeve and projecting through the opening in the adjacent leg, said last-mentioned opening having a vertically extending portion and a horizontally extending portion for engagement with said flattened lug for retaining said sleeve in projected position or in a position transverse thereto, a strut secured at one of its ends to said sleeve and projecting to and having a loose pivoted connection with another leg, said sleeve being engageable with said means at the top thereof, and extensible means projecting from the other end of said sleeve for engagement with the ground.

References Cited in the file of this patent

UNITED STATES PATENTS

| | | |
|---|---|---|
| 1,354,338 | Rapson | Sept. 28, 1920 |
| 2,078,596 | Barr et al. | Apr. 27, 1937 |
| 2,330,974 | Hoo | Oct. 5, 1943 |
| 2,416,796 | Dobbs | Mar. 4, 1947 |
| 2,439,854 | Lipshi | Apr. 20, 1948 |
| 2,519,364 | Freedholm | Aug. 22, 1950 |
| 2,634,941 | Eckert | Apr. 14, 1953 |